United States Patent [19]
Williams

[11] Patent Number: 5,240,264
[45] Date of Patent: Aug. 31, 1993

[54] CONTAINERS ON FOLDING WHEELS AND METHOD

[76] Inventor: Thomas L. Williams, 1410 N. 69th Ave., Hollywood, Fla. 33024

[21] Appl. No.: 826,388

[22] Filed: Jan. 27, 1992

[51] Int. Cl.⁵ ............................................. B62B 1/04
[52] U.S. Cl. .................................... 280/40; 211/194; 248/129; 280/654; 280/47.26
[58] Field of Search ...................... 280/40, 646, 39, 35, 280/652, 47.26, 79.2, 37, 654; 211/49.1, 194; 248/129

[56] References Cited

U.S. PATENT DOCUMENTS

| | | | |
|---|---|---|---|
| 1,409,838 | 3/1922 | Emery et al. | 280/40 |
| 1,612,980 | 1/1927 | Mattice | 280/79.2 |
| 1,961,394 | 7/1931 | Rothe | 211/30 |
| 2,981,549 | 4/1961 | Hotton | 280/47.35 |
| 4,118,048 | 10/1978 | Spranger et al. | 280/47.35 |
| 4,120,549 | 10/1978 | Bureau | 312/253 |
| 4,314,624 | 2/1982 | Royet | 280/646 X |
| 4,588,055 | 5/1986 | Chen | 280/37 X |
| 4,795,180 | 1/1989 | Polcyn' | 280/79.1 A |
| 4,864,334 | 9/1989 | Ellis | 280/47.2 X |
| 4,901,872 | 2/1990 | Lang | 211/194 X |
| 4,913,453 | 4/1990 | Wagner et al. | 280/79.2 |
| 4,976,450 | 12/1990 | Ellefson | 280/79.11 |
| 4,998,023 | 3/1991 | Kitts | 248/129 X |

*Primary Examiner*—Margaret A. Focarino
*Assistant Examiner*—Michael Mar
*Attorney, Agent, or Firm*—Oltman and Flynn

[57] ABSTRACT

A container for holding assorted items includes a rack, a compartment having a rear face and connected to the rack, a flange member extending from the rack which can pivot flat against the rear face of the compartment, and a wheel mounted on the flange member which can pivot with the flange member against the rear face of the compartment, to conserve space and prevent unwanted rolling of the container. The compartment is preferably an elongated, hollow cube, and a plurality of such compartments may be provided, one on top of the other, for the segregated retention of items. The rack preferably includes an essentially inverted U-shaped tube having a cross-segment and two parallel side segments. The compartment top and bottom faces have rack receiving ports for receiving the side segments of the rack. The side segments are each formed of multiple link portions removably connected together. A method of assembling a container as described above includes the steps of fitting the link portions together and into the cross-segment, and sliding the assembled side segments through the compartment ports. A method of disassembling a container as described above includes the steps of sliding the side segments out of the compartment ports, and pulling the link portions of the side segments and the cross-segment apart.

10 Claims, 5 Drawing Sheets

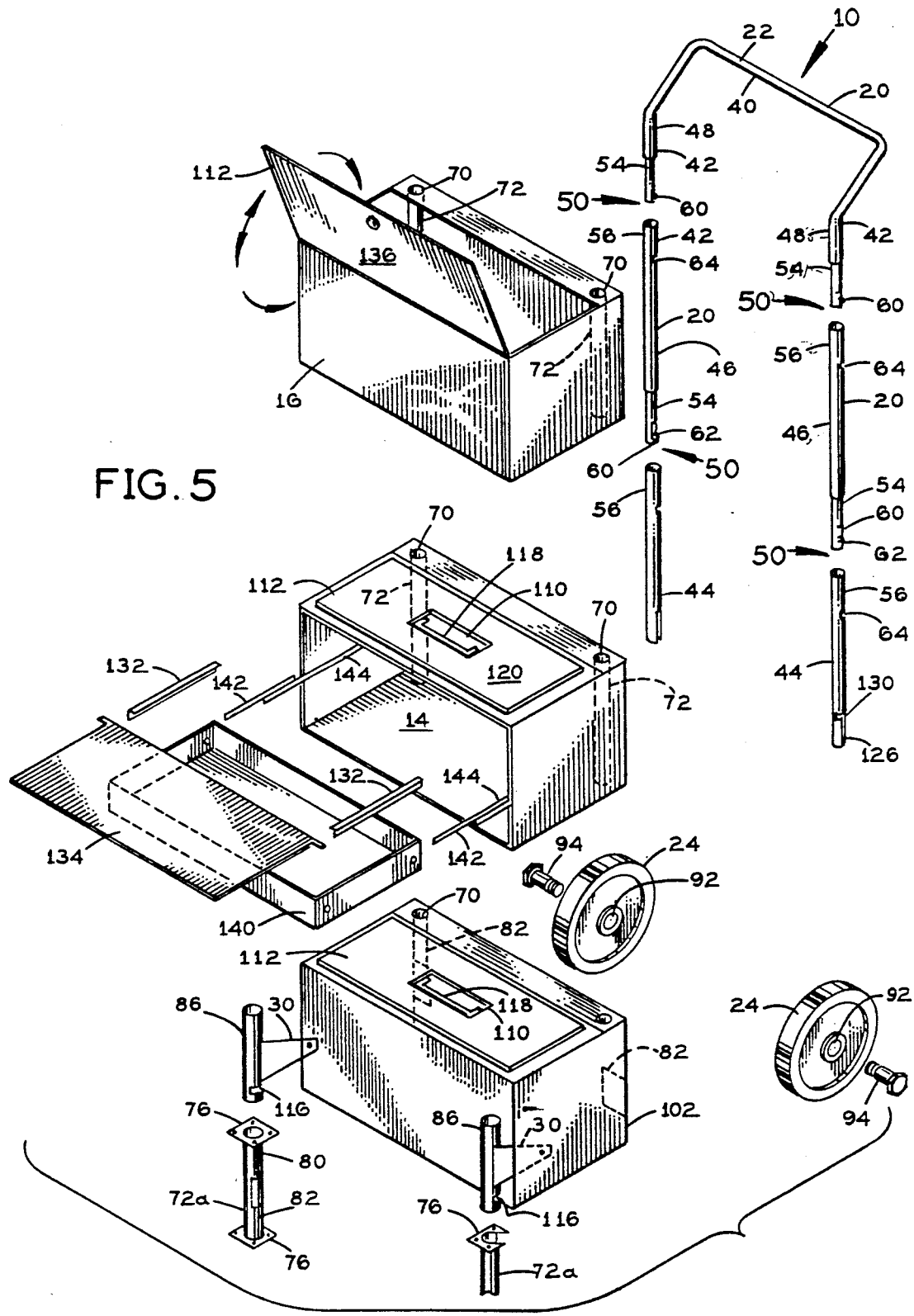

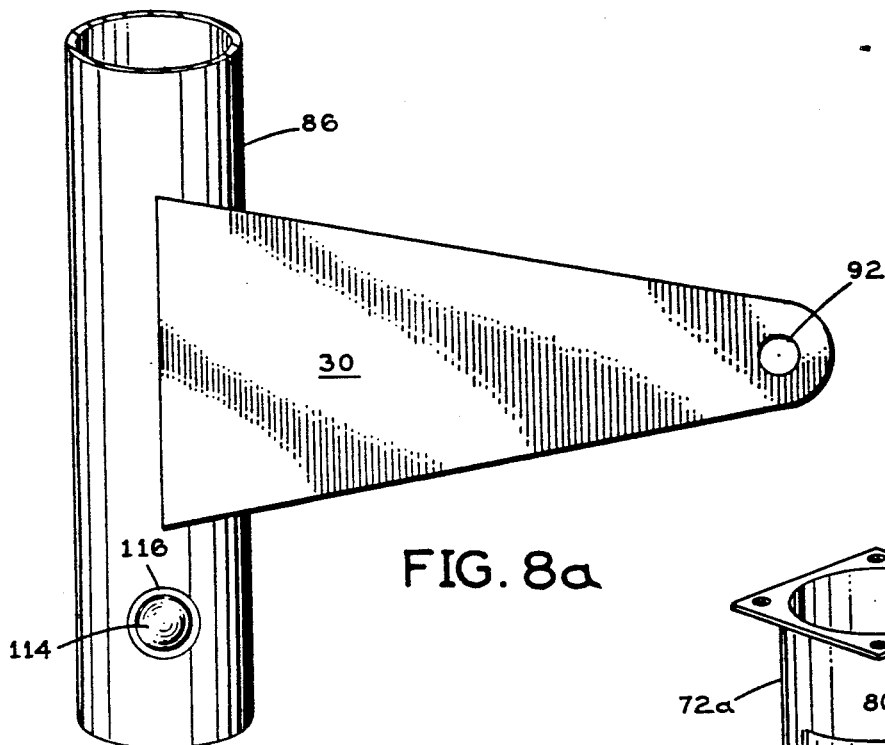
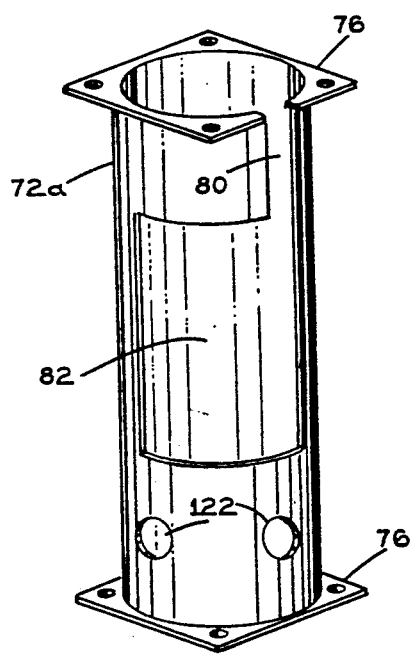
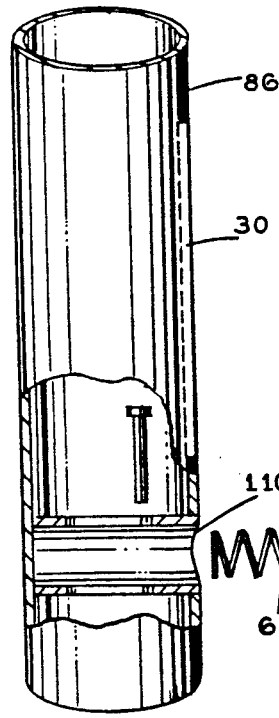
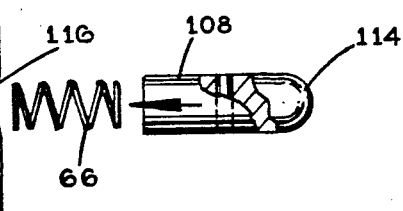
FIG. 8a
FIG. 7
FIG. 8b

CONTAINERS ON FOLDING WHEELS AND METHOD

BACKGROUND OF THE INVENTION

1. Field of the Invention

The present invention relates generally to the field of containers on wheels, and more specifically to a container which can be readily disassembled and which includes an essentially vertical rack extending through and supporting several compartments placed one on top of the other, the top of the rack having a handle and the bottom having wheels mounted on flange members which can pivot flat against the rear face of the lower compartment to conserve space and prevent unwanted rolling.

2. Description of the Prior Art

There have long been containers on wheels for storing and carrying various items, such as shop tools, products to be sold and medical instruments. These containers have presented a variety of problems, including their tendency to roll when accidently bumped and to have wheels which protrude when not in use, occupying limited storage space and tripping persons walking past.

One such container device is that of Rothe, U.S. Pat. No. 1,961,394, issued on Jun. 5, 1934. Rothe discloses a carriage including several trays removably mounted, one above the other, on vertical support members. The bottom-most tray is fitted with pivoting wheel assemblies permitting Rothe to be pushed along a curved path. The support members can be collapsed for compact storage. A problem with Rothe is that the wheels support the carriage at all times, so that if bumped or placed on a grade, the device can accidentally roll away. The wheels might be removed to prevent this, but such a procedure would be inconvenient for regular use. Another problem is that trays can spill their contents if tilted. Thus if the Rothe device rolls and strikes another object, it can capsize and scatter its contents.

A similar device is that of Ellefson, U.S. Pat. No. 4,976,450, issued on Dec. 11, 1990. Ellefson teaches a mechanic's tool chest in the form of a tall, rectangular box mounted on pivoting wheel assemblies, containing several drawers and having extendable trays on top. A problem with Ellefson, like Rothe, is that the wheels remain in the rolling position at all times, so that if bumped or placed on a grade, the device can roll away. Another problem is that the complicated drawer and tray arrangement makes Ellefson relatively costly. Also, Ellefson is not easily disassembled and so would consume considerable storage space when not in use.

Polcyn, U.S. Pat. No. 4,795,180, issued on Jan. 3, 1989, discloses a tool box having several wheels mounted on fixed axles which are tilted relative to the ground surface. A problem with Polcyn is that, like the above devices, it can roll at inopportune times. Another problem is that, if Polcyn were made large enough to carry an entire tool set, for example, it would be cumbersome and lacking in the compartmentalization needed for segregation of tools. Finally, no provision is made for ready disassembly for storage.

Bureau, U.S. Pat. No. 4,120,549, issued on Oct. 17, 1978, is a support device in the form of a hollow enclosure, for elevating a tool chest to a spaced distance above the level of the work bench area. A slidable shelf is provided which is extended for work and slid into the enclosure when not in use. Bureau is placed between a tool cabinet and a tool chest on top of the cabinet. A problem with Bureau is that it does not address or solve the problems of accidental rolling and limited storage space.

Spranger, U.S. Pat. No. 4,118,048, issued on Oct. 3, 1978, discloses several box-shaped cases fit one on top of the other on a wheeled platform. Like the devices described above, Spranger can accidentally roll away and its wheels protrude when not in use.

Hotton, U.S. Pat. No. 2,981,549, issued on Apr. 25, 1961, teaches a tool chest with many drawers mounted at one end on large wheels and at the other end on smaller, pivotal wheels. Problems with Hotton include unwanted rolling, storage bulk, and expense.

It is thus an object of the present invention to provide a wheeled container having multiple closed compartments which can be removed and handled individually.

It is another object of the present invention to provide such a container which can be easily assembled and disassembled for storage and transport.

It is still another object of the present invention to provide such a container which is compact and has wheels which fold away when not in use.

It is finally an object of the present invention to provide such a container which is relatively inexpensive to manufacture.

SUMMARY OF THE INVENTION

The present invention accomplishes the above-stated objectives, as well as others, as may be determined by a fair reading and interpretation of the entire specification.

A container is provided for holding assorted items, and includes a rack, a compartment having a rear face and connected to the rack, a flange member extending from the rack which can pivot flat against the rear face of the compartment, and a wheel mounted on the flange member which can pivot with the flange member against the rear face of the compartment, to conserve space and prevent unwanted rolling of the container. The compartment is preferably an elongated, hollow cube, and a plurality of such compartments may be provided, one on top of the other, for the segregated retention of items. The rack preferably includes an essentially inverted U-shaped tube having a cross-segment and two parallel side segments. The compartment top and bottom faces and have rack receiving ports for receiving the side segments of the rack. Tubular sheath members connect opposing ports on the top and bottom faces for receiving and guiding the side segments of the rack. The side segments are each formed of multiple link portions removably connected together.

A method is provided of assembling a container as described above, including the steps of fitting the link portions together and into the cross-segment, and sliding the assembled side segments through the compartment ports. A method is also provided of disassembling a container as described above, including the steps of sliding the side segments out of the compartment ports, and pulling the link portions of the side segments and the cross-segment apart.

BRIEF DESCRIPTION OF THE DRAWINGS

Various other objects, advantages, and features of the invention will become apparent to those skilled in the art from the following discussion taken in conjunction with the following drawings, in which:

FIG. 5 is an exploded view of the inventive container, illustrating the container in its disassembled mode. Hidden portions of the drawer and of the rack are shown in broken lines.

FIG. 7 is a perspective view of the slotted guide sheath in the lower compartment.

FIG. 8 is a perspective view of the rotatable tube and flange mount, featuring the coil spring loaded joint button option.

DETAILED DESCRIPTION OF THE PREFERRED EMBODIMENTS

Figure 1:
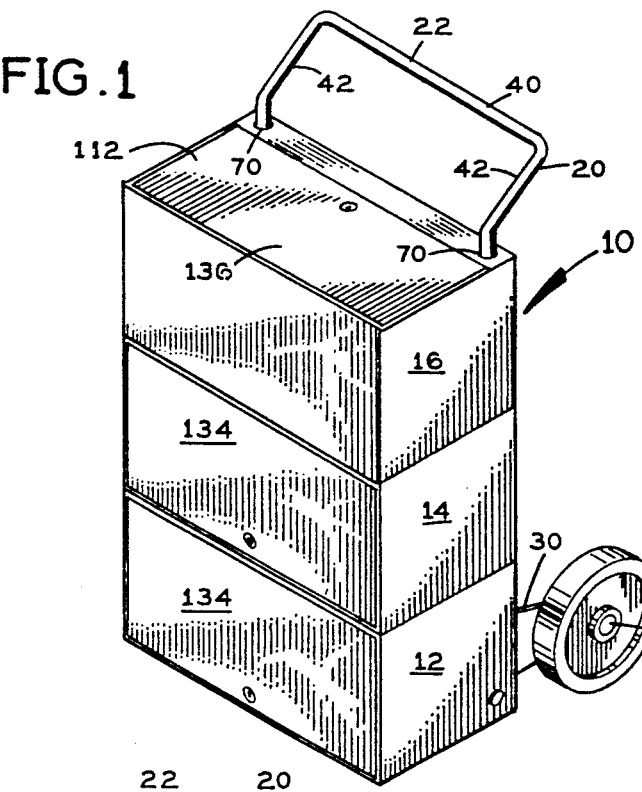
FIG. 1 is a perspective view of the inventive container with the flange mounts and wheels in the open position ready for use.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 2:
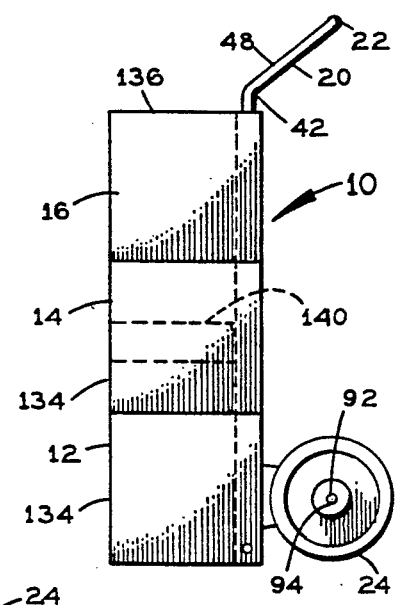
FIG. 2 is a side view of the inventive container with the wheels open for use. The drawer and hidden portions of the rack are shown in broken lines.
Figure 3:
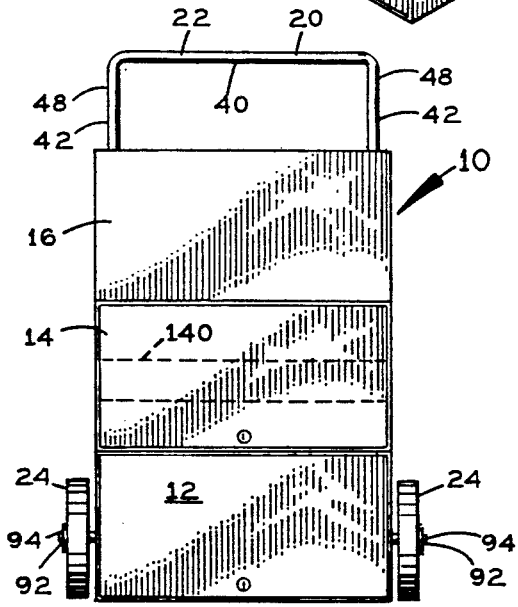
FIG. 3 is a front view of the inventive container with the wheels open for use. The drawer and hidden portions of the rack are shown in broken lines.
Figure 4:
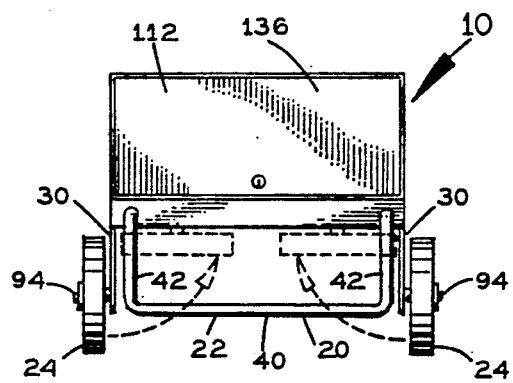
FIG. 4 is a top view of the inventive container with the wheels open for use. The drawer and hidden portions of the rack are shown in broken lines.
Figure 6A:
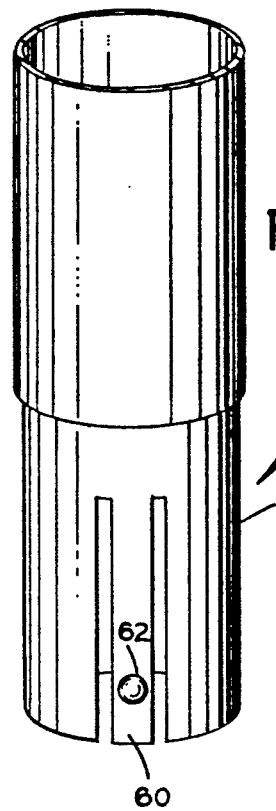
FIG. 6 is a close-up front view and side view of the releasable joints, featuring the resilient tab option.
Figure 6B:
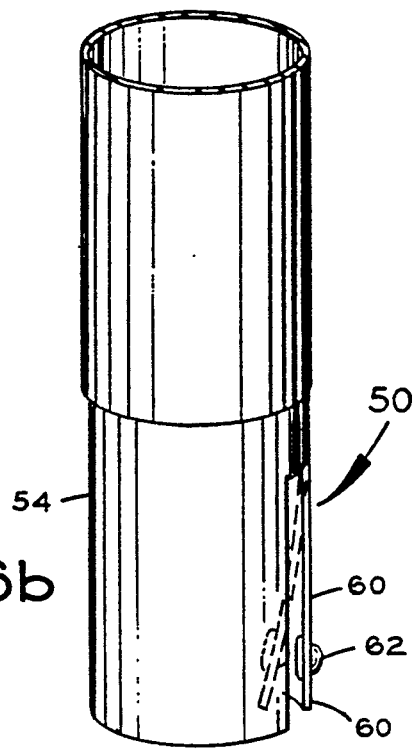
Figure 6C:
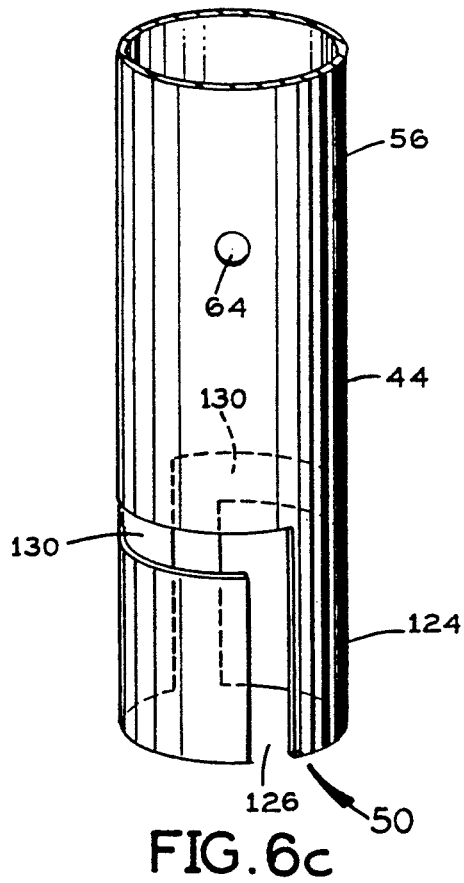
Figure 6D:
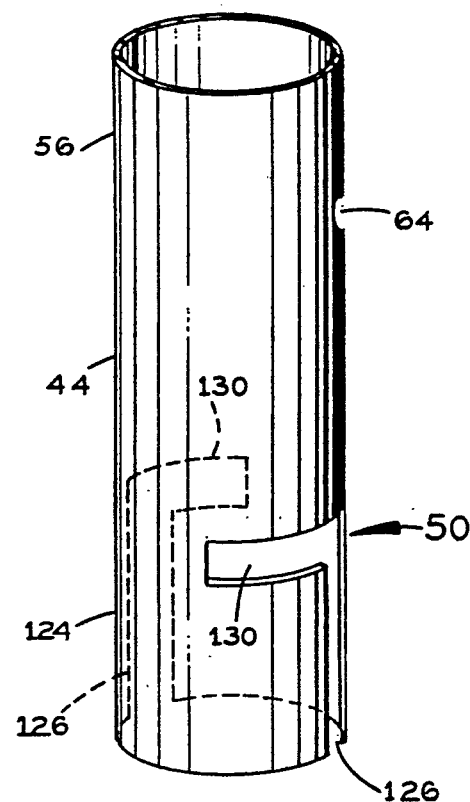

Referring to FIG. 1, a container 10 is disclosed which includes a lower compartment 12, a middle compartment 14 on top of compartment 12, and a top compartment 16 on top of compartment 14. Compartments 12, 14 and 16 are hollow, elongated cubes mounted on a rack 20 having a handle member 22 at its top end and wheels 24 at its bottom end. Wheels 24 are mounted on flange mounts 30, which can be rotated flat against compartment 12 when not in use. See FIGS. 2-4. Container 10 is constructed so that compartments 12, 14 and 16 can easily be removed from rack 20, and rack 20 separated into short segments for compact storage.

Rack 20 is preferably a tube bent into a squared, inverted U-shape, the cross-segment 40 constituting handle member 22. The parallel side segments 42 of rack 20 are each broken in two places for disassembly, forming a lower link 44, a middle link 46 and a top link 48, connected by releasable locking joints 50. Each locking joint 50 preferably includes a reduced diameter end portion 54 of one link which fits snugly into a receiving end 56 of the adjacent link. See FIG. 5. Reduced diameter ends 54 each have two parallel axial cuts forming a resilient tab 60 which has a button 62 attached to its outer surface. See FIG. 6. Receiving ends 56 each have a hole 64 sized and positioned to receive button 62 when reduced diameter end 54 is fit entirely into corresponding receiving end 56. Tab 60 deflects momentarily when end 54 enters end 56 and then snaps back into its rest position when button 62 aligns with hole 64. Cross-segment 40 and the very top portions of side segments 42 are preferably bent out of the plane of rack 20 at an acute angle for ease of gripping. See FIG. 2.

Compartments 12, 14 and 16 each have rack ports 70 on either end of their upper and lower faces in the rear corners for receiving side segments 42 of rack 20. Guide sheaths 72 preferably connect upper and lower ports 70, as shown in broken lines in FIG. 5, and guide side segments 42 through the compartments. Guide sheaths 72a in compartment 12 are of particularly heavy, durable construction, having lips 76 at each end for firm, secure attachment. An axial slot 80 is cut into each sheath 72a in compartment 12 and extends through about two thirds of the length of each sheath 72a. Slot 80 then opens laterally into a wider rectangular opening 82. See FIG. 7.

Figure 9:
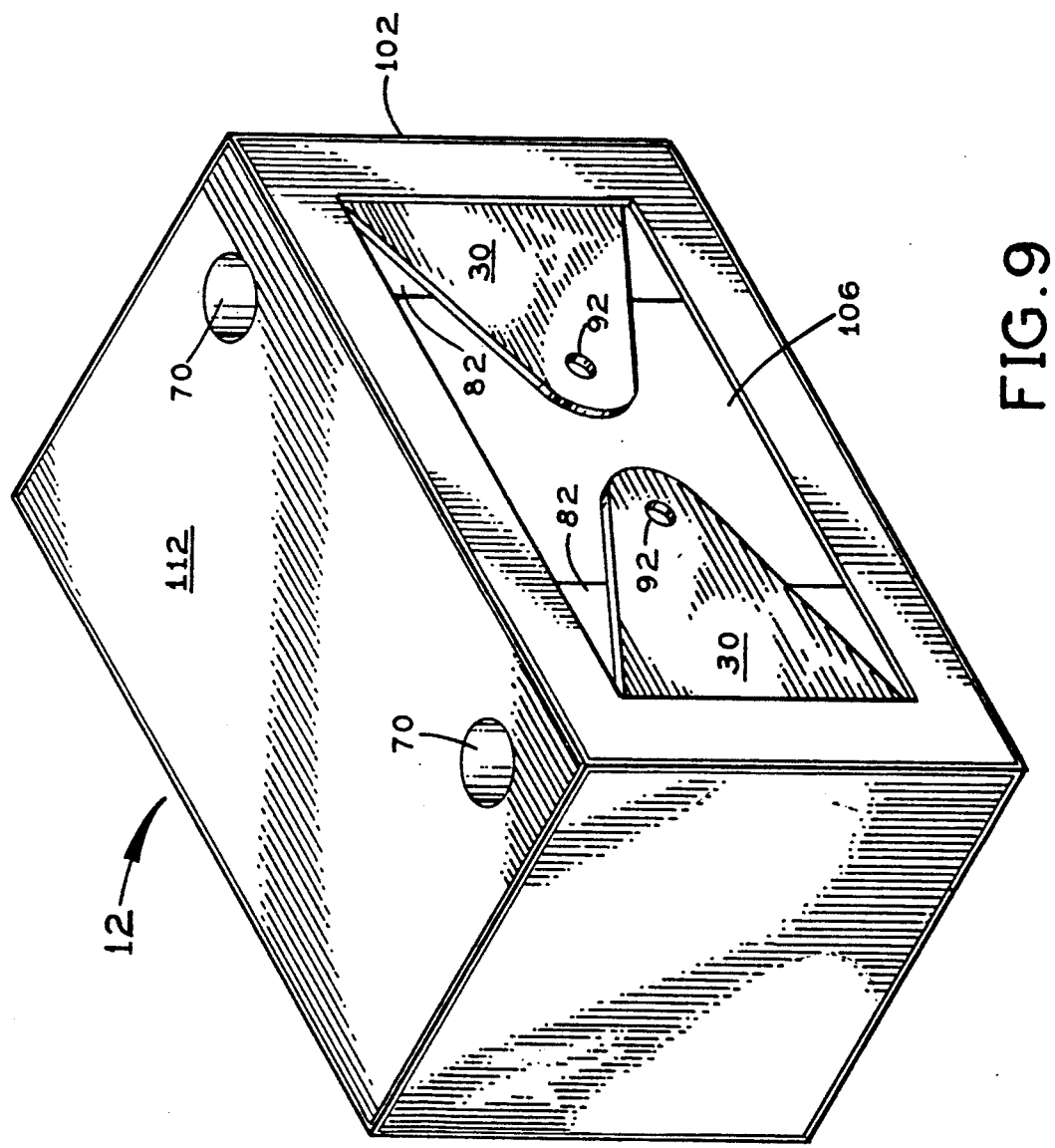
FIG. 9 is a perspective view of the rear of the lower compartment, showing the recess for receiving the closed flange mounts, and the flange mounts in the closed position within the recess, with the wheels omitted.

Pivot tubes 86 fit inside sheaths 72a in compartment 12. Each pivot tube 86 has an essentially triangular-shaped, planar flange mount 30 extending radially from its outer surface. See FIG. 8. Flange mounts 30 have left and right versions, which are mirror images of each other. See FIG. 9. Each mount 30 has a bore 92 for receiving an axle member 94 for mounting one of the wheels 24 to flange mounts 30. Flange mounts 30 extend out of compartment 12 through window openings 96 in the rear wall 102 of compartment 12, so that mounts 30 can rotate on tube 86 within sheath 72a, from a position perpendicular to rear wall 102 to a position parallel to and against rear wall 102. A recess 106 is provided in rear wall 102 to receive each flange mount 30 so that each member 90 can fold flush against wall 102. See FIG. 9.

The lower end 104 of each pivot tube 86 contains a diametrically positioned shaft 108 mounted on and secured to a coil spring 66. Shaft 108 has a rounded end 114 which is aligned with a port 116 in pivot tube 86 so that spring 66 biases end 114 to protrude through port 116. Fitting pivot tube 86 into its sheath 72a depresses rounded end 114 flush into port 116, until end 114 aligns with an opening 122 in the sheath 72a. Upon achieving this alignment, end 114 snaps into opening 122 as a result of spring 66 biasing, holding pivot tube 86 and sheath 72a together.

The lower end 124 of each lower link 44 fits within its corresponding pivot tube 86. Each lower end 124 has opposing axial slots 126 for laterally receiving shaft 108, each axial slot 126 turning at a right angle to form an engaging slot 130, as shown in FIG. 6. After shaft 108 has laterally slid to the full depth of both axial slots 126, flange mounts 30 are pivoted out from rear wall 102 which removably secures the lower link 44 and its corresponding pivot tube 86 together. This securing permits lower links 44 to receive an upward force, such as when container 10 is being used as a hand truck and is being pulled up stairs, without disengaging. Engaging slots 130 are preferably of sufficient depth to permit pivot tubes 86 to rotate for wheel positioning without causing lower links 44 to rotate with them. When disassembly is desired, one rotates each flange mount 30 to once again align shaft 108 with axial slots 126, and then pulls lower links 44 out of pivot tubes 86.

Compartments 12 and 14 each have a handle 110 on their top faces 112. Each handle 110 preferably has a square U-shape, is hinged, and rotates down into a depression 118 in top face 112. See FIG. 5. Top faces 112 of compartments 12 and 14 each preferably have a raised area 120 which fits snugly into a matching recessed area in the bottom face 128 of compartments 14 and 16, respectively. This arrangement is intended to keep compartments 12, 14 and 16 more fixedly together when container 10 is assembled, and handle 110 permits easy carrying of each compartment separately when container 10 is disassembled. The front faces of compartments 14 and 16 are preferably hinged doors 134. Doors 134 preferably slide back into compartments 12 and 14 when opened, on door brackets 132. Top face 112 of compartment 16 is preferably a hinged door 136. A drawer 140 is optionally provided in one or more compartments. FIG. 5 shows drawer 140 in middle compartment 14. Drawer 140 is slidably mounted on bracket members 142 and 144, according to well-known drawer bracket design.

METHOD

In practicing the invention, the following method may be used. Container 10 is assembled by fitting lower links 44, middle links 46, and middle links 46 into cross segment 40 at joints 50. Then side segments 42 are slid down into compartment ports 70 and through sheaths 72. Flange mounts 30 are then pivoted out from rear wall 102, positioning wheels 24 for use.

Disassembly is accomplished by essentially reversing these steps. Wheels 24 are folded against rear wall 102. Lower links 44 are rotated clockwise to disengage them from sheaths 72a. Side segments 42 are slid out of compartment ports 70. Then, side segments 42 are disassembled by pulling their links 44 and 46 and cross-segment 40 apart at joints 50. See FIG. 5.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A container for holding assorted items, comprising:
   rack means comprising an elongate segment;
   a compartment having a rear face and a top face and a bottom face, and ports in said top and bottom faces through which said elongate segment fits and passes through said compartment, for securing said compartment to said rack means,
   a flange member extending from said rack means,
   a wheel mounted on said flange member on which said container can roll,
   a tubular sheath member connecting opposing rack means receiving ports on said top and bottom faces for receiving and guiding said elongate segment of said rack means,
   said sheath member having an L-shaped slot, in the form of two connecting perpendicular leg portions, a first said leg portion being oriented parallel to the longitudinal axis of said sheath member for axially receiving said flange member during assembly and disassembly of said container and a second said leg portion extending essentially perpendicular to said first leg portion for receiving said flange member when said flange member is pivoted for locking said flange member against axial movement relative to said sheath member.

2. A container according to claim 1, wherein the compartment is an elongated, hollow cube.

3. A container according to claim 2, wherein a plurality of said compartments are provided, one on top of the other, for segregated retention of items.

4. A container as in claim 2, wherein said rack means comprises an essentially inverted U-shaped tube having a cross-segment and two said elongate segments essentially parallel to each other.

5. A container as in claim 4, wherein each said elongate segment is formed of multiple segment portions removably connected together.

6. A method of assembly of a container as in claim 6, comprising the steps of:
   fitting the segment portions together and into the cross-segment,
   and sliding the assembled elongate segments through the compartment ports.

7. A method of disassembly of a container as in claim 6, comprising the steps of:
   sliding the elongate segments out of the rack means receiving ports,
   pulling the link portions of the elongate segment and the cross-segment apart.

8. A container as in claim 1, wherein said compartment has a rear face and wherein said flange member can pivot on said rack means against said rear face, and wherein said wheel mounted on said flange member pivots with said flange member against said rear face of said compartment, to conserve space and prevent unwanted rolling of said container.

9. A container for holding assorted items, comprising:
   rack means comprising an elongate segment,
   a compartment having a rear face and a top face and a bottom face, and ports in said top and bottom faces through which said elongate segment fits and passes through said compartment, for securing said compartment to said rack means,
   a tubular sheath member connecting opposing rack means receiving ports on said top and bottom faces for receiving and guiding said elongate segment of said rack means,
   a flange member pivotably mounted on said elongate segment so that said flange member can pivot against said rear face of said compartment,
   a wheel mounted on said flange member on which said container can roll which can pivot with said flange member against said rear face of said compartment, to conserve space and prevent unwanted rolling of said container,
   wherein said sheath member has an L-shaped slot, in the form of two connecting perpendicular leg portions, a first said leg portion being oriented parallel to the longitudinal axis of said sheath member, and a second said leg portion extending essentially perpendicular to said first leg portion for receiving said flange member when said flange member is pivoted for locking said flange member against axial movement relative to said sheath member which receives and engages said flange member, when said elongate segment and said sheath member are axially rotated relative to each other.

10. A container as in claim 9, wherein said rack means comprises an elongate segment comprising first segment portion and a second segment portion, and wherein said flange member is mounted on said first segment portion, and said first segment portion is rotatably mounted on said second segment portion, and wherein said first segment portion has a radially protruding locking element and said second segment portion has an L-shaped slot, in the form of two connecting perpendicular leg portions, a first said leg portion being oriented parallel to the longitudinal axis of said second segment portion, and a second said leg portion extending essentially perpendicular to said first leg portion for receiving said locking element when said first segment portion is pivoted for locking said locking element against axial movement relative to said second segment portion which receives and engages said locking element, when said first and second segment portions are axially rotated relative to each other, so that said first and second segment portions, and said first segment portion and said sheath member, are simultaneously locked together by pivoting said flange member one way and are simultaneously unlocked by pivoting said flange member the other way.

* * * * *